W. H. JOHNSON,

Assignor of one-half interest to G. E. MARVINE.

Metal Neck Yoke.

No. 9,366. Reissued Aug. 31, 1880.

Attest:

Edna P. Hollingsworth

Nathan G. Lane.

Inventor.

W. H. Johnson

By Dodge Har

Attys.

N. PETERS, PHOTO-LITHOGRAPHER, WASHINGTON, D. C.

UNITED STATES PATENT OFFICE.

WILLIAM H. JOHNSON, OF DELHI, NEW YORK, ASSIGNOR OF ONE-HALF INTEREST TO GEORGE E. MARVINE.

METAL NECK-YOKE.

SPECIFICATION forming part of Reissued Letters Patent No. 9,366, dated August 31, 1880.

Original No. 186,425, dated January 23, 1877. Application for reissue filed June 19, 1880.

*To all whom it may concern:*

Be it known that I, WILLIAM H. JOHNSON, of Delhi, in the county of Delaware and State of New York, have invented certain new and useful Improvements in Metal Neck-Yokes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the new article of manufacture—a cast-metal neck-yoke—and in various details of construction hereinafter enumerated.

Figure 1:
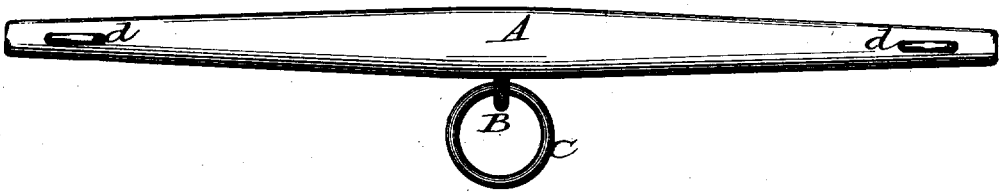
Figure 2:
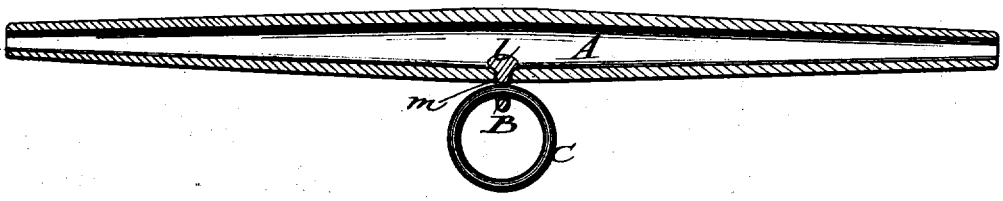
Figure 3:
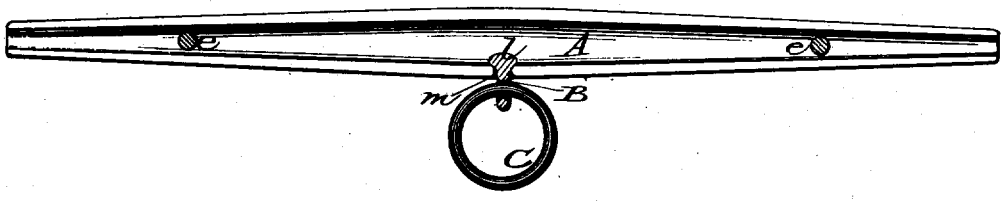
Figure 4:
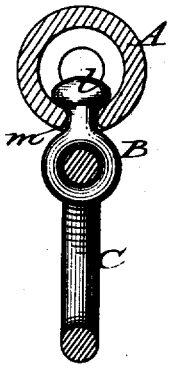
Figure 5:
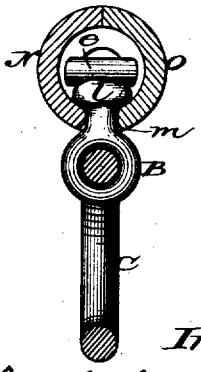

In the drawings, Figure 1 represents a face view of my improved device; Figs. 2 and 3, longitudinal sections, showing two different styles of construction; Figs. 4 and 5, transverse central sections of Figs. 2 and 3, and Fig. 6 a view illustrating one of the details of construction.

The object of my invention is to produce a neck-yoke which shall be at once light and ornamental in appearance and cheap and durable in construction.

To this end it consists in casting the yoke in a mold, either entire or in parts, iron being used as the material of which it is constructed.

It also further consists in a novel arrangement of the ring or loop through which the tongue passes and those which receive the breast straps or chains.

In the drawings, A represents the neck-yoke proper, which, as represented, is largest midway between the ends, and is cast hollow, the greatest thickness of metal being likewise at this point. This increased thickness of metal and diameter of body at the center is rendered necessary in consequence of two facts: First, the body is necessarily perforated at that point, when this style of construction is adopted, to receive an eye, B, which carries a ring or loop, C, through which the tongue of the vehicle passes; and, second, in addition to the weakening of the body at the center thus caused, the yoke, which is supported at each end by the breast straps or chains, and the pole of the vehicle, which bears at the center of the yoke, produce the greatest strain at that point. It is consequently apparent that the yoke should be heaviest and strongest midway between the ends.

The loop or ring C is mounted loosely in an eye, B, which, as shown in Figs. 2, 3, 4, and 5, is formed with a rounded head or enlargement, *l*, said enlargement occupying a position on the inside of the body A of the yoke, as shown. From this head or enlargement *l* there extends out through a perforation, *m*, in the body A a short cylindrical neck terminating in the eye B, which carries the loop or ring C.

As stated, the head *l* is rounded, as are also the sides or edges of the hole or perforation *m*, which arrangement allows considerable play to the eye B, and avoids the cutting and wear consequent upon using square corners or edges. As before mentioned, the body A of the yoke may be cast either entire or in parts, as preferred. When cast complete in one piece the eye B will be covered or washed with any well-known solution which will prevent the molten metal from adhering to it, placed in the mold in the proper position, and the molten metal run in around the neck of the same, this method of forming a loose joint in casting being well known and in common use, and therefore not necessary to be described further.

When the body A is cast in parts, however, a semicircular notch will be formed in each half of the body, and so located that when the two parts are secured to each other the notches shall form a circular opening. The neck of the eye B being placed in one of these notches, the two halves of the body are placed together, encircling the neck of the eye B, when the two parts are firmly joined one to the other by means of rivets *e* extending through the same, as shown in Figs. 3 and 5, or by means of screws, bolts, or similar devices.

Figure 6:
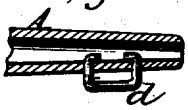

The loops *d*, which receive the breast straps or chains, may be cast on the body A, or may be formed as represented in Fig. 6, in which *d* is a loop, bent up of heavy wire or small round bar-iron, into the form shown. This is placed in the mold in the required position, and preferably covered with a flux to cause the molten metal to adhere to it when the same is run into the mold.

To guard against the loop *d* pulling out when, from any cause, the molten metal fails to adhere firmly to it, the ends of the same are bent around in such shape as to prevent its being drawn out.

When the yoke is cast of iron of suitable character, such as is well known in the art, it may be rendered malleable by the usual and well-known process.

The yoke may be finished by being painted, polished, varnished, plated, or otherwise ornamented.

It is obvious that the construction may be considerably modified without departing from my invention—as, for instance, the yoke may be made with ribs or flanges around it at the ends and middle, between which the breast-straps and pole-loop are passed around the yoke, this form being common with wooden neck-yokes.

The neck of the eye B and the loops *d* may be extended entirely through the yoke; but I prefer the form shown.

This device is very light and ornamental, especially when polished and plated, and is also strong and durable and cheap to manufacture.

I am aware that metal neck-yokes have been made heretofore, and consequently I do not claim such broadly; but, believing myself to be the first to make a tubular cast-metal yoke,

What I claim is—

1. As a new article of manufacture, a hollow cast-metal neck-yoke, substantially as described and shown.

2. As a new article of manufacture, a hollow metal neck-yoke cast complete in one piece.

3. In combination with the metal neck-yoke A, the central ring, C, attached thereto by means of the swivel-eye B.

WILLIAM H. JOHNSON.

Witnesses:
W. G. EDGERTON,
WALTER H. GRISWOLD.